US008759253B2

(12) United States Patent
De Leede et al.

(10) Patent No.: US 8,759,253 B2
(45) Date of Patent: Jun. 24, 2014

(54) CHEMICALLY ACTIVATED CARBON AND METHODS FOR PREPARING SAME

(75) Inventors: Ralph Richard De Leede, Amersfoort (NL); Eduardus Gerardus Johannes Staal, Amersfoort (NL); Michael Rodgers, Glasgow (GB); Wilhelmina Margaretha Theresia Maria Reimerink-Schats, Amersfoort (NL)

(73) Assignee: Cabot Norit Nederland B.V., Amersfoort (NL)

( * ) Notice: Subject to any disclaimer, the term of this patent is extended or adjusted under 35 U.S.C. 154(b) by 237 days.

(21) Appl. No.: 12/669,225

(22) PCT Filed: Jul. 18, 2008

(86) PCT No.: PCT/NL2008/050497
§ 371 (c)(1),
(2), (4) Date: May 28, 2010

(87) PCT Pub. No.: WO2009/011590
PCT Pub. Date: Jan. 22, 2009

(65) Prior Publication Data
US 2010/0298134 A1   Nov. 25, 2010

(30) Foreign Application Priority Data

Jul. 19, 2007   (EP) .................................. 07112806

(51) Int. Cl.
*C01B 31/12* (2006.01)
(52) U.S. Cl.
USPC .......................................... 502/424; 502/425
(58) Field of Classification Search
USPC ................................................ 502/424, 425
See application file for complete search history.

(56) References Cited

U.S. PATENT DOCUMENTS

| 3,864,277 | A | | 2/1975 | Kovach |
| 4,677,086 | A | | 6/1987 | McCue et al. |
| 5,039,651 | A | * | 8/1991 | Kosaka et al. ............... 502/424 |
| 5,204,310 | A | | 4/1993 | Tolles et al. |
| 5,538,932 | A | | 7/1996 | Yan et al. |
| 6,057,262 | A | * | 5/2000 | Derbyshire et al. .......... 502/423 |
| 6,540,815 | B1 | | 4/2003 | Hiltzik et al. |
| 6,866,699 | B2 | | 3/2005 | MacDowall et al. |

FOREIGN PATENT DOCUMENTS

| CN | 1868873 A | 11/2006 |
| DE | 4416576 | 11/1995 |
| EP | 0423967 | 2/1990 |
| EP | 0 557 208 | 8/1993 |
| EP | 0 423 967 | 8/1995 |
| EP | 0747321 | 12/1996 |
| JP | H04-144908 | 5/1992 |
| JP | H06-009208 | 1/1994 |
| JP | 2010-516946 | 5/2010 |

OTHER PUBLICATIONS

International Search Report, Application No. PCT/NL2008/050497, mailed Nov. 5, 2008.
Suhas et al.; "Lignin—from natural adsorbent to activated carbon: A review"; Bioresource Technology 98 (2007); pp. 2301-2312.
Harry Marsh & Francisco Rodriguez-Reinoso; Activated Carbon; Chapters 5 and 6; 2006.
Moreno-Castilla; Carbon vol. 39 (9); Aug. 2001.

* cited by examiner

*Primary Examiner* — Stuart Hendrickson

(57) ABSTRACT

The invention is directed to a chemically activated carbon, based on a combination of wood particles and comminuted carbonaceous vegetable material selected from kernel or shell material, in a weight ratio of between 5-95 to 90-10, preferably between 15-85 and 90-10, further optionally containing a binder, said carbon having been chemically activated using phosphoric acid or zinc chloride and to a process for producing same.

12 Claims, No Drawings

CHEMICALLY ACTIVATED CARBON AND METHODS FOR PREPARING SAME

This application is a national phase of International Application No. PCT/NL2008/050497 filed Jul. 18, 2008.

The present invention relates to activated carbon and methods for preparing the same. Particularly, this invention relates to new carbons useful in vapor adsorption and methods for their production. More particularly, this invention relates to activated carbon derived from carbonaceous material prepared by shaping and chemical activation to produce carbon of high density, low pressure drop, high hardness, low attrition and high activity.

Activated carbon is a microcrystalline, non-graphitic form of carbon which has been processed to increase internal porosity. Activated carbons are characterized by a large specific surface area typically in the range of 400 to 2500 $m^2/g$, which permits its industrial use in the purification of liquids and gases by the adsorption of gases and vapors from gases and of dissolved or dispersed substances from liquids. Commercial grades of activated carbon are designated as either gas-phase or liquid-phase adsorbents. Liquid-phase carbons generally may be powdered, granular, or shaped and gas-phase, vapor-adsorbent carbons are hard granules or hard, relatively dust-free shaped pellets.

Activated carbon is widely used in industry in the purification of liquids and gases. For example, a gas which is to be purified is passed through a bed of granular activated carbon. As the gas passes through the activated carbon bed, molecules of impurities in the gas are adsorbed onto the surface of the activated carbon.

Activated carbon is also used in industry for the storage and recovery of valuable components. For example a gas with a valuable component is passed through a bed of granular activated carbon. As the bed has been saturated the adsorbed component is recovered by desorption using a carrier gas passing counter current through the activated carbon bed or by lowering the pressure.

The available surface area of activated carbon is dependent on its pore volume. Since the surface area per unit volume decreases as individual pore size increases, large surface area is maximized by maximizing the number of pores of very small dimensions and/or minimizing the number of pores of very large dimensions. Pore sizes are defined by the International Union of Pure and Applied Chemistry as micropores (pore width<2 nm), mesopores (pore width 2-50 nm), and macropores (pore width>50 nm). Micropores and mesopores contribute to the adsorptive capacity of the activated carbon; whereas, the macropores reduce the density and can be detrimental to the adsorbant effectiveness of the activated carbon, on a carbon volume basis.

The adsorption capacity and rate of adsorption depend to a large extent upon the internal surface area and pore size distribution in relation to the dimensions of the adsorbate to remove. For purification the adsorption capacity and the adsorption rate must be as high as possible. Conventional chemically activated lignocellulose-based carbons generally exhibit more mesoporosity than steam activated carbon. On the other hand steam (so gas) activated carbon generally exhibit more microporosity.

The rate of desorption of an activated carbon depends to a large extent upon the internal surface area and pore size distribution. For pure adsorption an optimal adsorption capacity is achieved by maximizing the number of pores with dimensions just large enough to enclose the adsorbate molecules to be removed. An optimal fit between the adsorbate dimension and the pores dimension increases not only the adsorption capacity, it also increases the physical adsorption forces, preventing desorption. However for recovery of components, as low as possible adsorption forces are desired in order to improve the desorption process. So for recovery of components the optimal pores size distribution is a compromise between pores giving a high initial adsorption capacity and pores giving a low rest adsorption with as a consequence a high desorption capacity.

Different applications concerning the recovering of components from liquids and gases have been commercialized. One of the applications is the recovery of fuel vapor from the fuel tank in cars in Evaporative Loss Control Devices (ELCD) to prevent emission of fuel vapor to the environment. In this application emitted fuel vapor from the fuel tank is adsorbed on activated carbon during low speed driving and during parking. The adsorbed gasoline vapor is counter current desorbed (purged) during higher speed driving and streamlined to the engine and burned. By desorbing the adsorbed gasoline vapor adsorption capacity becomes available again for the next slow driving cycle and parking. The adsorption capacity available after purging is called "working capacity". Other known recovering applications are the recovery of vapors of fuel storage tanks and filters used for adsorption of vapors during on board refuelling.

For the ELCD application butane is used as model component and the carbon is specified on butane working capacity (BWC). By desorbing the gasoline counter current to the adsorption direction the outlet site of the filter has the lowest rest adsorption of the whole filter minimizing the emission from the outlet during the next adsorption cycle. This emission is also known as "bleeding".

For gas phase application, also the pressure drop, the hardness and the attrition is of importance, next to the optimal pores size distribution. The pressure drop should be as low as possible. The pressure drop decreases as the particle sizes increase. However the rate of adsorption and the rate of desorption decrease as the particle size increases. If a high adsorption and desorption rate is desirable, a compromise is necessary. A high hardness and a low attrition is necessary to prevent deterioration of the carbon adsorbent during a many years stay in a filter, especially in recovery applications. Shaped carbons as extrudates can be produced with an optimal diameter and a high hardness and low attrition Commercial activated carbon has generally been made from material of plant origin, such as wood (hardwood and softwood), corncobs, kelp, coffee beans, rice hulls, fruit pits, nutshells, e.g. from coconut, and wastes such as bagasse and lignin. Activated carbon also has been made from peat, lignite, soft and hard coals, tars and pitches, asphalt, petroleum residues, and carbon black. Activation of the raw material is accomplished by one of two distinct processes: 1) chemical activation, or (2) gas activation. For full scale production steam is usually used as gas in gas activation The effective porosity of activated carbon produced by steam activation is the result of gasification of the carbon at relatively high temperatures (after an initial carbonization of the raw material), but the porosity of chemically activated products generally is created by chemical dehydration/condensation reactions occurring at significantly lower temperatures.

Chemical activation typically is carried out commercially by impregnation of the carbonaceous material precursor with a chemical activation agent, and the blend is heated to a temperature of 350° C.-700° C. Chemical activation agents reduce the formation of tar and other by-products, thereby increasing yield.

Chemical activation of carbon is only possible for carbonic materials having sufficient oxygen and hydrogen content, namely at least 25% (atom) of oxygen and 5% of hydrogen. This means that regular coal materials cannot be chemically activated to any useful extent.

In DE 4416576 C a process for preparing globular active carbon is described, wherein a mixture of carbonaceous raw material, coal, cellulose, a salt mixture at least containing a lithium salt and a self hardening resin binder is formed into globules, followed by hardening and carbonizing. No chemical activation occurs in this process. Further, unwanted components are used herein that do not add to the useful properties of the activated carbon of the invention, such as fat coal or resin binder.

Chemically activated carbon, by virtue of its raw materials and manufacturing process, tends to be of low density with a highly developed mesopore structure, optionally combined with a high developed large micropores structure. For gas phase recovery processes a high adsorption capacity combined with a fast desorption rate and high desorption capacity is important, for which a highly developed large micropore structure is required. As a rule activated carbons are in granular shape for gas phase processes. The highly developed micropore structure is a desirable feature, whereas the low density is a disadvantage of any granular form of chemically activated carbon. The success of any process to manufacture granular chemically activated carbon is dictated by its capacity to combine retention of the microporous and mesoporous nature with development of a high density by minimisation of macroporosity, which does not contribute to adsorptive effectiveness.

Therefore, the pore structure of the carbon with its inherent surface area is of paramount importance in determining the effectiveness of the activated carbon as an adsorbent.

However, in the case of granular activated carbon the density is also an important feature of the effectiveness of the adsorbent, as the application of granular activated carbon is invariably in the form of a static bed of fixed volumetric size.

The normal method used to determine the efficiency of a granular activated carbon for purification is the weight of material it can adsorb, per unit volume of activated carbon up to breakthrough. For recovery it is important to determine the weight of material it can desorb per unit volume of activated carbon.

This test is normally carried out by placing a volume of activated carbon in a standard U-tube and passing a vapor through the activated carbon bed optionally followed by desorbing the adsorbed material.

The carbon is weighed before and after this process and the difference provides the weight of substance adsorbed or desorbed by the carbon.

The raw material normally used in the production of chemically activated carbon is a carbonaceous vegetable material such as wood which has been milled to about 2-5 mm particle size. The activated carbon when produced is usually ground into a powder form for use in liquid purification. For use in gas purification the activated carbon can also be broken (for example 10*35 mesh) or the activated carbon can be shaped into pellets of various sizes, optionally using a binder before or after activation. Shaped carbons and especially extrudates show a low pressure drop, a high hardness and low attrition In U.S. Pat. No. 4,677,086 the binding of activated carbon in extrudates using an inorganic binder has been described. In the described method a separate step is necessary for producing extrudates. Activated carbons produced in this way have been limited in BWC.

In EP-A 557 208 also a chemical activation process of a granular material has been described using wood as starting material. According to this process, wood powder is mixed with phosphoric acid. After mixing plasticizing takes place during heating to the activation temperature. By regulation the temperature profile, further plasticizing takes place. This document describes methods to handle and to use the plasticization to increase the performance of the product (higher BWC; butane working capacity). The plasticisation is carried out in a separate step. After the plasticization the material is shaped for example by spheronizing or by extrusion. For extrusion the plasticized material is milled. The material must be "soft" enough for shaping as extrusion. After shaping the material is activated.

In U.S. Pat. No. 5,538,932 an activatable binder is added before extrusion and activation to produce an activated carbon with enhanced hardness and physical integrity.

In EP-A 423 967 a process to produce activated carbon directly by chemically activation of a shaped granular material containing a high lignin vegetable raw material is described. According to this process milled vegetable raw material, such as olive stone powder is mixed with phosphoric acid, shaped by extrusion, dried and activated.

The prior art gas-phase carbons described in U.S. Pat. No. 4,677,086 and in EP-A 423 967 have been satisfactory for limited volumes of vapors emitted from the fuel tank. Because of impending environmental regulations requiring capture of greater amounts of fuel vapor emissions, it is anticipated that the volume of these additional vapors, combined with the space limitations and economic considerations which limit expansion of the size of canister systems, will require activated carbons with higher densities, higher activities, and higher volumetric working capacities than disclosed by this prior art.

Impending environmental regulations require capture of greater amounts of fuel vapor giving lower emissions as a consequence of breakthrough in combination with a lower emission as a consequence of bleeding of fuel vapor from the carbon at the outlet site of the filter after purging. Carbon properties giving a lower bleeding show also a lower ageing. A lower ageing has as a consequence a longer lifespan of the carbon filter, which is of importance to assure cars fulfill the emission requirements also after driving 100,000 miles or more.

The prior art gas-phase carbons described in EP-A 557 208 and U.S. Pat. No. 5,538,932 are produced have been satisfactory for large volumes of vapors emitted from the fuel tank. The capture of large volumes has been at the cost of the bleeding causing a higher emission vapor from the carbon at the outlet site of the filter after purging.

The prior art gas-phase carbons described in U.S. Pat. No. 4,677,086, EP-A 557 208 and U.S. Pat. No. 5,538,932 are produced according to extensive multi step processes making the production process for these carbons expensive In U.S. Pat. No. 4,677,086 an activated carbon is produced according to a process applied for the production of powders or broken carbons The powdered activated carbon is bound with a binder and heat treated at high temperature. In EP-A 557 208 and U.S. Pat. No. 5,538,932 a separate plasticization step after mixing of the raw material with phosphoric acid has to be carried before shaping drying and activation.

The prior art gas-phase carbons described in EP-A 423 967 is produced according to a limited step processes making the production process for these carbons less expensive. After mixing of the raw material with phosphoric acid, the blended material is shaped, directly followed by drying and activation.

To be practicable the shape of extrudates have to stay intact during all the process steps after extrusion and not sweat phosphoric acid, sticking the particles together forming big lumps, which are difficult to activate. Big lumps are not suited for gas phases processes because a decrease of kinetics, caused by the low external surface area of the particles and by a large void fraction, causing a low density and leakage flows as a consequence of the irregular shape. This phenomenon makes it difficult to use wood in these processes. The use of less activating agent in relation to the vegetable raw material is not possible because of the extrusion ability of the mixture. So the raw material/activating agent ratio is not flexible to adjust and this limits the product optimization and process ability.

There is need for further improved activated carbons, especially with respect to bleeding of organic vapors, capacity, ageing characteristics, processability, flexibility and performance.

The invention is based on the surprising finding that the use of a combination of on the one hand wood particles and on the other hand a young vegetable material, such as shells and kernels, result in a synergistic improvement of a number of the properties of the activated carbon.

In a first embodiment the invention is characterized by a chemically activated carbon, based on a combination of wood particles and comminuted carbonaceous vegetable material selected from kernel or shell material, in a weight ratio of between 10-90 to 90-10, preferably between 15-85 and 90-10, further optionally containing a binder, said carbon having been chemically activated using phosphoric acid or zinc chloride.

The binder is preferably present in a concentration of up to 35 wt. %, based on the weight of said combination of wood particles and comminuted carbonaceous vegetable material plus binder. If present, the concentration preferably is at least 5 wt. %, based on the weight of said combination of wood particles and comminuted carbonaceous vegetable material plus binder.

In a second embodiment the invention is characterized by the process of producing this chemically activated carbon. This process for producing a chemically activated carbon, comprises the steps of: providing a starting material in the form of a mixture of wood particles and comminuted carbonaceous vegetable material from kernel material and comminuted carbonaceous vegetable material from shell material and optionally a binder; mixing said starting material with a chemical activating agent, selected from phosphoric acid and zinc chloride, to impregnate the particles with the chemical activating agent; pelletising (shaping) said mixture comprising the chemical activating agent to form pellets; subjecting said pellets to a heat treatment, comprising heating the pellets to remove water and other volatile constituents present to consolidate the granular nature; and carbonising the treated particles, preferably at a temperature from about 350 to about 700° C., in particular from about 400 to about 650° C. No separate heat pre-treatment plasticization step before shaping is necessary.

The weight ratio wood particles to comminuted carbonaceous vegetable material usually is between 10-90 to 90-10.

If present, the concentration of the binder usually is up to 35 wt. % based on total weight before activation, preferably 5-35 wt. %. As a binder material preferably an activatable binder is used, such as lignin or lignin compounds.

Such method for preparing activated carbon according to the invention is in particular suitable for preparing activated carbon according to the invention.

In a third embodiment the invention is directed to the use of an activated carbon as defined above or produced in accordance with the invention, in an evaporative loss control device.

Surprisingly, it has been found that the invention provides a way to obtain chemically activated carbon in a simple way, using wood as a raw material combined with a comminuted carbonaceous vegetable material or a binder, whilst maintaining a good-working capacity, and improving shape stability (low tendency of the pellets to stick together) compared to a comparable process wherein activated carbon is prepared from only wood material.

Surprisingly, it has been found that the combined use of wood particles and comminuted carbonaceous vegetable material or binder even results in an improved activated carbon, more in particular in respect to the adsorptive properties, such as working capacity and processing into final particles for use in various processes, more in particular in devices to reduce vapor emission from vehicles (evaporative loss control devices). In particular, the use of a combination of wood particles and comminuted carbonaceous vegetable material, plus optionally binder, may even provide a synergistic effect with respect to the working capacity.

More in particular it has been found, that the increase of the amount of wood particles in the mixture with comminuted kernel or stone material, results in a large improvement of the properties, which improvement is maintained over the whole range of the ratio in the mixture.

A further advantage resides in the increased flexibility in the selection of the starting materials, which makes it possible, while retaining the good product properties, to select the cheapest combination of materials, depending on the market situation.

An important property of the activated carbon of invention is the measure of bleeding and ageing, which is determined on the basis of the butane retentivity. The value thereof is preferably below 7.5 g/100 g, as determined in accordance with ASTM D5228.

The raw materials used in the production of chemically activated carbon of the invention are on the one hand wood. Preferably the wood particles are selected from wood chips, saw dust and wood flour.

On the other hand, nut shell, fruit stone and kernel, and in particular, olive stone, almond shell and coconut shell are especially useful as the second component of the mixture. These materials are also preferably used in comminuted form, as chips or flour.

The particle size of the wood and other particles can be selected within wide ranges.

In particular, the particle size of the comminuted vegetable materials may be characterized by at most 5 weight % having a size of less than 1 µm and at least 95 weight % having a size of less than 750 µm. More in particular at most 5 weight % may have a size of less than 1 µm and at least 95 weight % has a size of less than 500 µm.

In particular, the particle size of the wood particles materials may be characterized by at most 5 weight % having a size of less than 1 µm and at least 95 weight % having a size of less than 750 µm. More in particular at most 5 weight % may have a size of less than 1 µm and at least 95 weight % has a size of less than 500 µm.

For the mixture particles sizes are preferably chosen to provide a high density and good processing properties, in particular with respect to low shrink by plasticization.

The particles are mixed with the chemical activating agent, preferably as an aqueous solution. This agent is based on phosphoric acid or zinc chloride, preferably phosphoric acid. The preferred phosphoric acid is a 50-86% aqueous ortho phosphoric acid, for instance a 60-80% aqueous ortho phosphoric acid. The chemical activation agent does not contain lithium-salts.

The chemical activating agent is added to the combination of wood particles and comminuted carbonaceous vegetable material in a weight ratio of between 1:1 and 3:1 respectively and preferably a ratio of between 1.5:1 and 2.2:1.

It is to be noted that the mixture preferably consists only of the wood particles, comminuted carbonaceous vegetable material selected from kernel or shell material, in a weight ratio of between 10-90 to 90-10, binder, chemical activating agent, water and optional binder.

The mixture is shaped especially by extrusion to get hard, processable extrudates with diameters between 1.5 and 5 mm.

The mixture is then preferably heated to plasticise the wood material within the extrudates whereas the vegetable material act as a template preventing sweating. This heating is preferable to a final temperature of between 100 and 200° C., in particular for a duration of between 10 and 50 minutes. During this treatment the material plasticises and dries. Subsequently it is carbonised at a temperature suitable for this, such as a temperature between 350 and 700° C.

After activation the activated carbon according to the present invention is very hard with a low attrition and with a low pressure drop The activated carbon according to the present invention is especially suited for use in adsorptive processes, more in particular those processes wherein a high adsorptive capacity During carbonization at 430° C. up to 470° C. for 20 minutes the mixture is activated. After carbonization the carbon is washed to recover the phosphoric acid. As VM olive stone flour (OSF) or coconut shell flour (CSF) has been used. As WM soft wood flour (SWF), hard wood flour (HWF) and waste wood flour (WWF) has been used. To be practicable the shape of extrudates has to be intact during all the process steps after extrusion and not stick together forming big lumps, which are rather difficult to activate. Big lumps are not suited for gas phases processes because a decrease of kinetics caused by the low external surface area of the particles and by a large void fraction, causing a low density and leakage flows as a consequence of the irregular shape. Using different types of VM and WM the activated carbon was evaluated on process-ability and on stability of the shape. In Table 1, the results thereof have been given.

TABLE 1

| Raw material | Scale | Process-ability |
|---|---|---|
| 100% OSF | Lab | Practicable, extrudates did not stick against each other |
| 25% SWF/75% OSF | Lab. | Practicable, extrudates did not stick against each other |
| 50% SWF/50% OSF | Lab. | Practicable, extrudates did not stick against each other |
| 75% SWF/25% OSF | Lab. | Practicable extrudates did not stick against each other |
| 20% HWF/80% OSF | Lab. | Practicable, extrudates did not stick against each other |
| 50% HWF/50% OSF | Lab. | Practicable, extrudates did not stick against each other |
| 25% WWF/75% OSF | Lab | Practicable, extrudates did not stick against each other |
| 100% CF | Lab. | Practicable, extrudates did not stick against each other |
| 20% CF/80% HWF | Lab. | Practicable, extrudates did not stick against each other |
| 100% HWF | Lab. | Not practicable, extrudates did stick against each other, forming one big lump sticking to the kiln wall |
| 100% SWF | Lab. | Not practicable, extrudates did stick against each other, forming one big lump sticking to the kiln wall | has to be obtained within a relatively small volume. Due to the higher capacity per volume, the material can be used to improve adsorptive processes.

An especially important embodiment is the use in evaporative loss control devices, for example as described in the U.S. Pat. Nos. 6,866,699 and 6,540,815, the contents of which is incorporated herein by way of reference. A very interesting embodiment of the present invention resides therein that the carbon is used on the one hand as an extrudate in the first stage of the device according to the first patent and then in the form of a monolith in the second stage thereof.

The invention is now elucidated on the basis of the following, non-limiting examples.

EXAMPLES

Example 1

On laboratory scale, vegetable raw material (VM), having a particle size range 5 wt. %<10 μm and 95 wt. %<500 μm was mixed in various ratios with wood raw material (WM), having a particle size range 5 wt %<10 μm and 95 wt. %<500 μm. A pure 65% aqueous phosphoric acid (PA) solution was added in a ratio of 1:1.4 up to 1:2.1. dependent of the raw material uses The mixture was blended, followed by extrusion. The extrudates consisting of VM, WM and phosphoric acid were heated at 150° C. for 35 minutes, followed by carbonization Example 2

Three sets of experiments have been carried out with 100% OSF and with OSF replaced by SWF. Each set of experiments has been carried out under the same process conditions. The sets have been produced using different batches OSF and SWF, with different OSF/SWF ratio's, with pure PA or with recovered PA and on different scale. Small samples have been produced in one batch on gram scale, large samples have been produced on Kg scale by blending a number of small sample batches. The process conditions were within the ranges as mentioned in example 1. In table 2 the results thereof have been given for BWC and retentivity.

Surprisingly the results show an increase in BWC for OSF/WF mixtures compared to 100% OSF-carbon.

Bleeding and ageing have a relation with the retentivity. Bleeding is mentioned as an important property for fulfilling LEVII requirements for automobiles. Ageing is the decrease in working capacity (WC) in time for carbons applied in a filter in a car during a large number of parking/driving cycles. A high retentivity predicts a high bleeding and a fast ageing Surprisingly the results show a numerous decrease in retentivity for the OSF/SWF mixtures compared to 100% OSF-carbon.

A higher content of SWF in the OSF/SWF mixture raises the effect on BWC increase and retentivity decrease

TABLE 2

OSF replacements by different types and different contents of SWF

| Sample size | PA conc. % | Activation temp K | VM | WM | VM/WM Ratio | BWC g/100 cm$^3$ | Butane rententivity g/100 g |
|---|---|---|---|---|---|---|---|
| Small | 65R | 450 | OSF1 | | 100/0 | 10.2 | 4.8 |
| Small | 65R | 450 | OSF1 | SWF1 | 75/25 | 10.6 | 3.3 |
| Large | 65R | 430-470 | OSF1 | | 100/0 | 11.2 | 5.0 |
| Large | 65R | 430-470 | OSF1 | SWF1 | 75/25 | 11.6 | 3.9 |
| Small | 65P | 450 | OSF2 | | 100/0 | 11.7 | 4.9 |
| Small | 65P | 450 | OSF2 | SWF2 | 20/80 | 13.1 | 2.5 |

Example 3

Four sets of laboratory samples with different types of. WF have been produced according to the recipe given in example 1. As WF has been used SWF, HWF and WWF. The sets have been produced with different batches OSF and SWF, with different OSF/WF ratio's and with pure PA or with recovered PA. In table 3 the results thereof have been given for BWC and retentivity. Next to SWF also HWF and WWF can be used to replace OSF.

TABLE 3

OSF replacements by different types and different contents of WM

| PA | Vegetable material (VM) | Wood material (WM) | VM/WM Ratio | BWC g/100 cm$^3$ | Butane rententivity g/100 g |
|---|---|---|---|---|---|
| 65R | OSF1 | | 100/0 | 10.2 | 4.8 |
| 65R | OSF1 | SWF1 | 75/25 | 10.6 | 3.3 |
| 65R | OSF1 | | 100/0 | 10.2 | 4.8 |
| 65R | OSF1 | WWF | 75/25 | 12.7 | 4.3 |
| 65P | OSF2 | | 100/0 | 11.7 | 4.9 |
| 65P | OSF2 | SWF2 | 20/80 | 13.1 | 2.5 |
| 65P | OSF2 | | 100/0 | 11.7 | 4.9 |
| 65P | OSF2 | HWF | 80/20 | 12.7 | 3.2 |
| 65P | OSF2 | HWF | 50/50 | 13.4 | 2.9 |

Example 4

Laboratory samples with different types of VM have been produced according to the recipe given in example 1. As VM material has been chosen CSF instead of OSF. In table 4 the results thereof have been given for BWC and retentivity Results given in table 4 show the same trends. Replacing of a part of the CSF by WF gives an increase in BWC and a decrease in retentivity as seen for experiments with OSF

TABLE 4

OSF replacement by CSF

| Vegetable material (VM) | Wood material (WM) | VM/WM Ratio | BWC g/100 cm$^3$ | Butane rententivity g/100 g |
|---|---|---|---|---|
| CSF | | 100/0 | 11.0 | 4.9 |
| CSF | HWF | 20/80 | 12.9 | 3.2 |

Example 5

On full scale a 2 ton production run has been carried out. The trial started with the production of activated carbon consisting of 100% olive stone flour (OSF). OSF having a particle size range 5 wt. %<10 μm and 95 wt. %<300 μm was mixed with 65% aqueous plant phosphoric acid solution a ratio of 1:1.4. The mixture was blended, followed by extrusion. To produce activated carbon the extrudates were heated at 150° C. up to 35 min followed by carbonization at 430° C. to 500° C. up to 35 minutes. After carbonization the carbon is washed. The run is continued by replacing 25% of the OSF by soft wood flour (SWF) So the OSF having a particle size range 5 wt. %<10 μm and 95 wt. %<300 μm was mixed with 25% soft SWF having a particle size range 5 wt. %<10 μm and 95 wt. %<300 μm. A 65% aqueous plant phosphoric acid solution was added in a ratio of 1:2 and the mixture was blended, followed by extrusion. To produce activated carbon the extrudates mixture consisting of OSF, SWF and phosphoric acid were heated at 150° C. up to 35 min followed by carbonization at 430° C. to 500° C. up to 35 minutes After carbonization the carbon is washed to recover the phosphoric acid. The activated carbon was evaluated on process ability and on stability of the shape. Replacing 25% of the OSF by SWF is very good practicable on full scale. Extrudates did not stick against each other. In table 5 the results for BWC and retentivity have been given for the full scale production run starting with 100% OSF and ending with 75% OSF and 25% SWF. The results show an increase in BWC and a decrease in retentivity as predicted by lab. scale experiments as a consequence of the replacing of OSF by SWF.

The results of the lab sample, produced with plant acid and the same raw material as used for full scale experiment has been involved in table 5. Full scale produced activated carbons show a higher BWC and a higher retentivity than lab scale produced. Seen the difference in BWC between laboratory scale and full scale samples of a BWC of more then 15 must be feasible on full scale seen the lab results

TABLE 5 full scale experiments with OSF-SWF mixtures

| | Vegetable material (VM) | Wood material (WM) | VM/WM Ratio | BWC g/100 cm³ | Butane rententivity g/100 g |
|---|---|---|---|---|---|
| Full trial 2007 | OSF1 | | 100/0 | 11.9 | 7.4 |
| Full trial 2007 | OSF1 | SWF1 | 75/25 | 13.7 | 5.4 |
| Lab trial | OSF1 | SWF1 | 75/25 | 11.6 | 4.1 |

The full scale production samples have been tested on ball pen hardness according to NSTM4.04, which test method has bee based on ASTM D 3802-79 The results are given in table 6. The results show no difference in BPH by replacing OSW by SWF

TABLE 6

BPH full scale samples

| | Vegetable material (VM) | Wood material (WM) | VM/WM Ratio | BPH % |
|---|---|---|---|---|
| Full trial 2007 | OSF | | 100/0 | 83 |
| Full trial 2007 | OSF | SWF | 75/25 | 83 |

Example 6

Laboratory samples with different fractions WM and VM have been mixed before extrusion. The other process conditions have been described in example 1. The results are given in table 7. The experiment with WM (5%<25 95<600 μm) was practicable but the extrusion was more difficult than with a finer fraction

TABLE 7 different particle fractions

| Vegetable material (VM) OSF | Wood material (WM) WF | VM/WM Ratio | BWC g/100 cm³ | Butane rententivity g/100 g |
|---|---|---|---|---|
| 5% < 8.3 μm; 95% < 150 μm | 5% < 25 μm; 95 < 600 μm | 80/20 | 13.0 | 3.9 |
| 5% < 8.3 μm; 95% < 150 μm | 5% < 8.1 μm; 95% < 336 μm | 80/20 | 12.7 | 3.2 |
| 5% < 8.3 μm; 95% < 150 μm | 5% < 5.1 μm; 95% < 182 μm | 50/50 | 13.4 | 2.9 |
| 5% < 250 μm; 95% < 560 μm | 5% < 7.2 μm; 95% < 160 μm | 80/20 | Difficult to extrude | |
| 5% < 250 μm; 95% < 560 μm | 5% < 8.1 μm; 95% < 336 μm | 80/20 | Difficult to extrude | |

The results show that limitations in particle size distribution (PSD) of VM and WM are important in relation to the processability. Especially too coarse VM material shows problems during extrusion Example 7

Laboratory samples with addition of binders to the extrusion mixture have been produced according to the recipe given in example 1 As binder has been chosen lignosulphonate. The lignosulphonate concentration was 20%. The laboratory scale production samples have been tested on ball pen hardness according to NSTM4.04, which test method has bee based on ASTM D 3802-79
The results are given in table 9. The results show an increase of BPH. However by such a high content of LS the BWC decreases

TABLE 8 the addition of lignosulphonate as binder

| Vegetable material (VM) | Wood material (WM) | VM/WM Ratio | LS/(VM + WF) ratio | BPH % | BWC g/100 cm³ | Butane rententivity g/100 g |
|---|---|---|---|---|---|---|
| OSF1 | HWF3 | 50/50 | 0 | 69 | 13.4 | 2.9 |
| OSF1 | HWF3 | 50/50 | 20 | 90 | 9.6 | 4.0 |

The invention claimed is:

1. A process for producing chemically activated carbon comprising:
    forming a mixture comprising wood particles, comminuted carbonaceous vegetable materials selected from the group consisting of kernel and shell material, and a chemical activating agent selected from the group consisting of phosphoric acid and zinc chloride;
    shaping said mixture;
    heating the mixture to remove water and other volatile constituents present; and
    chemically activating the particles by carbonising the particles,
    wherein the chemically activated carbon has a butane working capacity greater than 10.2, and a butane retentivity lower than 7.5 g/100 g of activated carbon.

2. The process of claim 1, wherein the wood particles are selected from the group consisting of wood chips, saw dust, and wood flour.

3. The process of claim 1, wherein the vegetable material is selected from the group consisting of nut shell, fruit stone, olive stone, almond shell, and coconut shell.

4. The process of claim 1, wherein the mixture further comprises a binder.

5. The process of claim 4, wherein the binder is selected from the group consisting of lignin and a lignin compound.

6. The process of claim 1, wherein the chemical activating agent is present in the mixture in a weight ratio of between 1.0:1 and 3:1, based on the weight of the wood particles and comminuted carbonaceous vegetable material.

7. The process of claim 1, wherein the chemical activating agent is phosphoric acid and is present in a weight ratio of between 1.5:1 and 2.2:1, based on the weight of the wood particles and comminuted carbonaceous vegetable material.

8. The process of claim 1, wherein at most 5 wt. % of the comminuted vegetable material is formed by particles having a diameter of less than 1 µm, and at least 95 wt. % of the comminuted vegetable material is formed by particles having a diameter of less than 750 µm.

9. The process of claim 1, wherein at most 5 wt. % of the wood particles are formed by particles having a diameter of less than 1 µm, and at least 95 wt. % of the wood particles is formed by particles having a diameter of less than 750 µm.

10. The process of claim 1, wherein the carbonising is performed at a temperature between 350° C. and 700° C.

11. The process of claim 1, wherein the heating is performed at a temperature between 50° C. and 200° C.

12. The process of claim 1, wherein the chemically activated carbon has a butane working capacity from 10.2 to 13.7.

* * * * *